United States Patent [19]

Sabato et al.

[11] Patent Number: 5,128,680
[45] Date of Patent: Jul. 7, 1992

[54] MODULATED RANGE TONE SYSTEM

[75] Inventors: Charles A. Sabato, Crosswicks, N.J.; Michael S. Newell, Bensalem, Pa.

[73] Assignee: General Electric Company, East Windsor, N.J.

[21] Appl. No.: 608,051

[22] Filed: Oct. 31, 1990

[51] Int. Cl.⁵ .............................................. G01S 13/00
[52] U.S. Cl. ...................................... 342/60; 342/352
[58] Field of Search ...................... 342/60, 352, 387

[56] References Cited

U.S. PATENT DOCUMENTS

| | | |
|---|---|---|
| 3,763,492 | 10/1973 | Easton . |
| 3,769,589 | 10/1973 | Buntschuh et al. . |
| 4,584,541 | 4/1986 | Nossen . |
| 4,628,286 | 12/1986 | Nossen . |
| 4,704,574 | 11/1987 | Nossen . |

Primary Examiner—Theodore M. Blum
Attorney, Agent, or Firm—William H. Meise; Clement A. Berard; Stephen A. Young

[57] ABSTRACT

A range tone system for determining the range between a satellite or spacecraft and a ground station FM modulates one of a 3968 Hz, 283 Hz or 35 Hz range tone onto a 27.77 Khz range tone. Modulation is accomplished by simultaneously addressing a plurality of PROMs by related clocks. The PROMs are preprogrammed with data representing the 27.77 KHz tone frequency-modulated by another range tone. Narrow-band filtering recovers the 27.77 KHz range tone from the received signal, and frequency demodulation coupled with narrowband filtering recovers the lower-frequency tone. The two recovered tones are processed simultaneously to provide both high resolution range information together with ambiguity resolution.

9 Claims, 7 Drawing Sheets

FIG. 7a
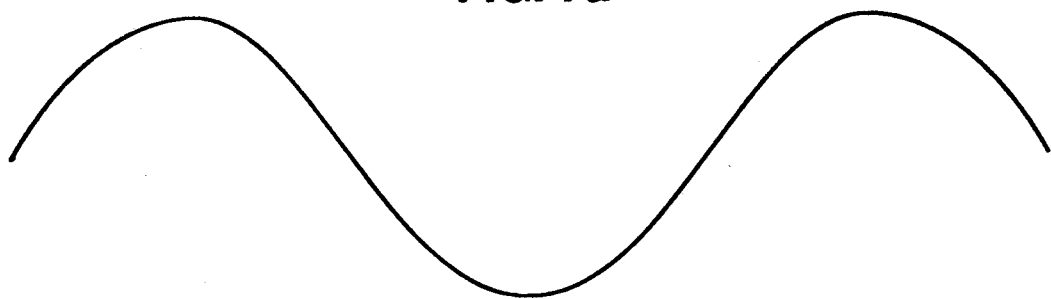
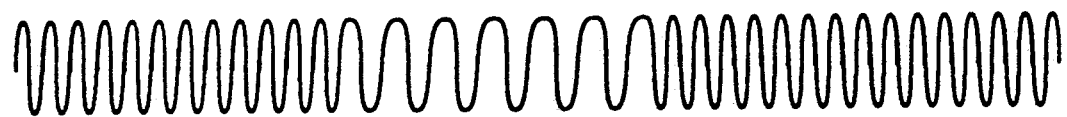
FIG. 7b

MODULATED RANGE TONE SYSTEM

The Government has rights in this invention pursuant to subcontract number B20001 with the Department of Commerce.

This invention relates to systems determining range and more particularly to range tone ranging systems for spacecraft or satellite.

Control of spacecraft requires knowledge of the spacecraft's location. An important aid in determining the location of a spacecraft is knowledge of the slant range between a ground station and the spacecraft. A radar system could be used to determine the range, but such a system requires high-powered pulse generators and a great deal of dedicated equipment.

Spacecraft are ordinarily equipped with a great deal of communications equipment for communicating with a ground station. Such equipment may be adapted for receiving commands instructing the satellite to adopt certain attitudes or orbits, to turn payload equipment on or off, to report its status, and the like. Some satellites are intended and especially designed to be communications repeaters, and therefore the payload itself is adapted for communication with ground stations. Similarly, the ground stations typically include high gain antennas, transmitters and similar communication equipment adapted for communicating with the satellite.

A range tone system can be used to determine range when the spacecraft is cooperative in the sense that it can retransmit signals back to the ground station. A range tone ranging system is basically the same as a radar in that range is determined from knowledge of the velocity of light and from the time required for the round trip of a signal between the ground station and the spacecraft.

Range tone systems take advantage of the existing communication equipment between a spacecraft and a ground station by transmitting a range tone from the ground station to the satellite, and by retransmitting the same signal back to the Earth station. Comparison circuits at the ground station insert the range tone into the existing communications channels and extract the returned range tone therefrom. A phase indicating device then may be used to compare the phase of the transmitted range tone with the phase of the received range tone. Simple algorithms relate the measured phase and the range tone frequency to the satellite range. FIG. 1 illustrates such a system.

In FIG. 1, a satellite designated generally as 10 includes a body 12 on which a pair of solar panels 14 is mounted for generating electrical power for operating the satellite. A transmit-receive antenna illustrated as 16 communicates along a line-of-sight path 18 with a ground station designated generally as 20. At ground station 20, a transmit-receive antenna 22 directed along line-of-sight 18 allows transmission and reception of signals between the satellite and ground station. A source 24 of video, data or control signals couples the signals to an upconverter 26 which upconverts the signals to a carrier frequency. The upconverted signals are applied to an input port 28 of a circulator 30, which circulates the signals to antenna 22 for transmission. The spacecraft may receive a portion of the transmitted signal, convert it to another frequency, and retransmit it back to ground station. Return signals are coupled from antenna 22, and through circulator 30 and its output port 32 to a downconverter 34. Downconverter 34 converts the signals to an Intermediate Frequency (IF) or to baseband, and applies the resulting signals to a utilization apparatus illustrated as a video or data processing block 36.

As mentioned, the range is determined by measuring the phase of the transmitted and returned range tones. A range tone at a frequency of 35 Hz has a wavelength corresponding to approximately 5300 miles. The wavelength of a 35 Hz range tone transmitted from a ground station occupies the entire distance between the ground station and a spacecraft at a range of 5300 miles, and the retransmitted range tone likewise has a wavelength corresponding to the range. The phase indicating device has an error which may be a percentage of the relative angular phase. For example, the phase measuring device may have an accuracy of $\pm 1$. At 35 Hz, one degree of phase error corresponds to a range error of about 15 miles, so an inaccuracy of $\pm 1$ in the phase detector corresponds to about a 30 mile possible error. This is a very poor range resolution. A simple and effective method for increasing the range resolution is to increase the frequency of the range tone. Range tones as high as 27.7777... KHz (hereinafter "27 KHz") have been used in the prior art. A 27 KHz range tone has a wavelength of about 6.5 miles, and 1° phase error corresponds to about 0.02 miles or 100 feet. Thus, the use of a relatively high-frequency range tone dramatically increases the range resolution. The higher the frequency of the range tone, the smaller its wavelength. The 27 KHz range tone (6.5 mile wavelength) may have several hundred wavelengths in a distance corresponding to the range to a satellite. An indication of phase which ranges from 0° to 360° provides good range resolution as mentioned above, but may result in a range ambiguity of a multiple of wavelengths, which in this case is a multiple of 6.5 mile increments. Prior art range tone systems may use several different range tones in order to resolve the ambiguity inherent in the higher-frequency range tones.

The range tones cannot in general have frequencies identical to those of the video, data or command signals which the satellite communication systems carry, or interference will result. Some of the command signals produced by generator 24 of FIG. 1 may include baseband components, such as synchronizing pulses representing a long string of logic 1 or logic 0 levels. For this reason, and also because of the low processing gain typical of low-frequency operation, range tones cannot inhabit the baseband regions. The lower frequency range tones are therefore ordinarily FM modulated onto a 19 kilohertz (KHz) subcarrier. The 19 KHz frequency was originally selected because of the ready availability of equipment used for FM stereo operation. The 27 KHz range tone, however, is not modulated onto the 19 KHz carrier, because the lower FM side bands would extend into the baseband region and fold over, thereby interfering with the command data, and the higher sidebands would extend into the telemetry bands. A 27 KHz tone FM modulated onto a 19 KHz subcarrier might therefore adversely affect both the command systems and telemetry systems. In order to modulate the 27 KHz range tone onto a carrier, the carrier would have to be raised to 133 KHz or more to maintain the same ratio of modulating frequency to carrier frequency as is used with the 3968 Hz range tone and 19 KHz carrier. This falls well within the telemetry frequency range, and might adversely affect telemetry operation.

A particular prior art system similar to that of FIG. 1 uses four range tones, namely 35 Hz, 283 Hz, 3968 Hz, and 27.77 KHz. In FIG. 1, range tone generator 40 generates either the above mentioned 27 KHz range tone or one of the 35 Hz, 283 Hz, or 3968 Hz range tones FM-modulated onto a 19 KHz subcarrier, under the control of a selection signal received over data path 100. The selected range tone generated by generator 40 is applied over a path 42 to be combined with the data, video or commands generated by video or data generator 24 for application to upconverter 26. The signal received at ground station 20 from satellite 10 is downconverted to baseband or to an intermediate frequency (IF) in a downconverter 34, as mentioned above, and the baseband range tone is coupled to a range tone processor illustrated as a block 44. Range tone processor 44 includes an FM demodulator for demodulating, under control of the selection signal on data path 100, the particular range tone which is modulated onto the 19 KHz subcarrier. Processor 44 also includes filters for filtering the range tone signal for reducing noise. The processed range tone is coupled over a path 46 to a phase indicating device 48 which may be a commercial phase meter. An output may be provided visually on a panel meter of the phase meter, and/or a phase-indicative signal may be coupled from phase indicating device 48 to a computer illustrated as a block 50, which repetitively performs computations to determine range.

In operation of the arrangement of FIG. 1, the 27 KHz range tone may be selected at range tone generator 40, and the corresponding filter of range tone processor 44 is simultaneously selected. A high-resolution indication of range is thereby generated by computer 50, but is subject to ambiguity. Periodically, the range tone generator and processor are switched (either manually or by the computer) to the 3968 Hz range tone for ambiguity elimination. The 283 Hz and 35 Hz tones are then selected in turn, as necessary, to eliminate ambiguity in the next higher range tone. At ordinary satellite attitudes, any ambiguity in the 35 Hz range tone indication may be resolved in other ways, as by direct observation, triangulation or the like. In general, once the satellite is in a stable orbit, its range will be known within certain limits, which may reduce the need to use all of the range tones to determine range. It may then only be necessary to use the 27 KHz and 3968 Hz range tones.

FIG. 2 is a simplified block diagram of prior art range tone generator 40 of FIG. 1. In FIG. 2, a 1 MHz crystal (XTAL) oscillator 60 produces a clock signal which is divided by eighteen in a divider 62, to produce a 55.55 KHz signal on a conductor 55. A flip-flop (FF) 57 operates on the 55.55 KHz signal which it receives from conductor 55 to generate a symmetrical square wave with a 27 KHz frequency. A symmetrical square wave reduces the harmonic content, which makes the following filtering operations easier. A bandpass filter 27 centered on the 27 KHz frequency filters the square wave to produce a 27 KHz sinusoid on a conductor 64 for application to inputs of multiplexers 66 and 68, respectively.

The 55.55 KHz signal on conductor 55 is divided by 7 in a counter 70 to produce a 7.93 KHz signal on a conductor 79. The 7.936 KH KHz signal on conductor 79 is operated upon by a flip-flop 72. Flipflop 72 produces a 3.968 KHz square wave, which is filtered by a bandpass filter 74 to produce a 3.968 KHz sinusoid. The sinusoid from filter 74 is applied to an input of a multiplexer 76.

The 7.936 KH KHz signal on conductor 79 is divided by 16 in a counter 78 to produce a 496 Hz signal, which is applied to a further divide-by-seven counter 80 and to a flip-flop 82. Flip-flop 82 generates a square wave with a frequency of 283 Hz, which is filtered to produce a sinusoid of the same frequency for application to a further input of multiplexer 76. The 496 Hz signal from counter 78 which is applied to counter 80 is divided by seven to produce a 70 Hz signal. The 70 Hz signal from counter 80 is operated on by a flip-flop 92 to produce a 35 Hz square wave. The 35 Hz square wave is low pass filtered in a filter 94 to form a 35 Hz sinusoid which is applied to a further input of multiplexer 76.

Multiplexer 76 selects one of the 3.968 KHz, 283 Hz, or 35 Hz sinusoids for application to an output conductor 96 under the control of a 2-bit control signal received from range tone select data path 100. The control signal may come from a front-panel selection switch or from a computer, as desired. The selected sinusoid is applied from conductor 96 to a further input of multiplexer 66, and also to the input of a 19 KHz FM modulator 102. Modulator 102 FM-modulates the selected one of the three lower-frequency range tones onto a 19 KHz carrier, and applies the resulting modulated signal to an input of multiplexer 68. Multiplexer 68 responds to one bit of the range tone select signal applied from range tone select data path 100 for selecting either the modulated signal from modulator 102 or the 27 KHz range tone from conductor 64, and couples the selected signal onto conductor 42 for coupling to upconverter 26 of FIG. 1. Multiplexer 66 responds to the range tone selection signal applied to port 100 for selecting between the 27 KHz range tone and the output of multiplexer 76, which is one of the three lower-frequency range tones at baseband. The baseband range tone selected by multiplexer 66 is applied as a reference over conductor 43 to phase indicating device 48 of FIG. 1.

FIG. 3 is a simplified block diagram of a prior art received range tone processor, corresponding to block 44 of FIG. 1. Downconverted signals from downconverter 34 of FIG. 1 are applied over conductor 45 to a 19 KHz FM discriminator 310 and to a narrow-band 27 KHz phase lock loop (PLL) 312. The received downconverted signal from downconverter 34 of FIG. 1 should include, if range tones are being used, either range-tone modulated 19 KHz signal or a 27 KHz range tone. If downconverter 34 of FIG. 1 downconverts to an IF frequency, a further conversion to baseband may be needed. If the signal received on conductor 45 of FIG. 3 includes the 27 KHz range tone, PLL 312 responds, and effectively selects the 27 KHz range tone from other signals. A suitable bandwidth for PLL 312 may be 5 Hz. The filtered 27 KHz range tone is applied to an input of a multiplexer 314. If the signal received over conductor 45 is a modulated 19 KHz signal, discriminator 310 responds, by FM demodulating, in order to reproduce the modulating signal. The reproduced signal is applied to the input of a multiplexer 316. Multiplexer 316 responds to one bit of the range tone selection signal applied from data path 100 for coupling the 3968 Hz signal by way of a narrow band 3968 Hz PLL to an input of multiplexer 314, and for coupling the 283 Hz and 35 Hz range tones in common to the input of a pair of low pass filters 320 and 322, which low-pass filter the signals with 300 Hz and 40 Hz bandwidths, respectively, and apply the filtered signals separately to additional inputs of multiplexer 314. Multiplexer 314 responds to the range tone selection signal applied from data path 100 and couples the selected range tone onto conductor 46 for application to phase indicating device 48 of FIG. 1.

In operation, the arrangement of FIG. 1, when used with range tone generator 40 of FIG. 2 and range tone processor 44 of FIG. 3 produces baseband reference signals for the selected range tone on conductor 43 and corresponding range tones on conductor 46 of FIG. 1, delayed by the delay of path 18. Phase indicating device 48 of FIG. 1 compares the phases of the reference and delayed range tones, and indicates the phase difference between the signals. The range may be calculated manually, or a computer may sequentially select range tones, determine range and resolve ambiguity to provide data representative of range.

It should be emphasized that the absolute phase shift between the reference and returned range tones is not itself a good indication of the range of the spacecraft, because of the delays inherent in the upconverter and any transmitter associated therewith, and in the downconverter and any receiver associated therewith. As is well known to those skilled in the art, resonant filters may exhibit large phase shifts, so phase shifts also occur in the range tone processor of FIG. 3. These phase shifts are handled by periodically normalizing the system by coupling upconverter 26 of FIG. 1 directly to downconverter 34, and noting the phase shift. The phase shift may then be subtracted from the phase shift attributable to a round-trip transmission. Phase shifts attributable to processing of the signal by the spacecraft may be taken into account by an initial measurement, before launch.

Some modern spacecraft orbit at low attitudes, at which the corresponding range may change rapidly. For this reason, the high-resolution range can be determined as in the prior art using the 27 KHz range tone, but in the interval between the determination of high resolution range and the resolution of the ambiguity by subsequent use of a 3968 Hz range tone, the motion of the spacecraft may result in an incorrect determination of which cycle of the 27 KHz range tone provided the high resolution range. It would be desirable to measure range simultaneously with a plurality of range tones, but the 27 KHz range tone is not generated simultaneously with the 19 KHz subcarrier because they tend to interfere with each other, i.e., they are close enough in frequency so that isolating one from the other is difficult, and detection of one results in partial detection of the other. Harmonics of the 19 KHz subcarrier tend to fall into the telemetry bands and may require that certain telemetry frequencies not be relied upon. An improved ambiguity resolution scheme is desired.

SUMMARY OF THE INVENTION

A spacecraft ranging system includes first and second range tones at different frequencies. The lower-frequency range tone is modulated onto the higher frequency range tone for transmission between the ground station and the satellite. The returned modulated range tone signal is demodulated to separate the range tone signals. The two range tone signals are processed simultaneously to provide simultaneous high resolution and ambiguity resolution information. In a particular embodiment of the invention, read-only memories (ROMS or PROMS) are programmed with data representative of FM-modulated signals which, when addressed in sequence by a clock, produce the desired range-tone modulated signals.

DESCRIPTION OF THE DRAWING

FIG. 7a illustrates an amplitude-time plot of a 3968 Hz sinusoid, and FIG. 7b is a corresponding plot of a 27 KHz sinusoid frequency-modulated by the 3968 Hz signal of FIG. 7a.

DESCRIPTION OF THE INVENTION

Figure 1:
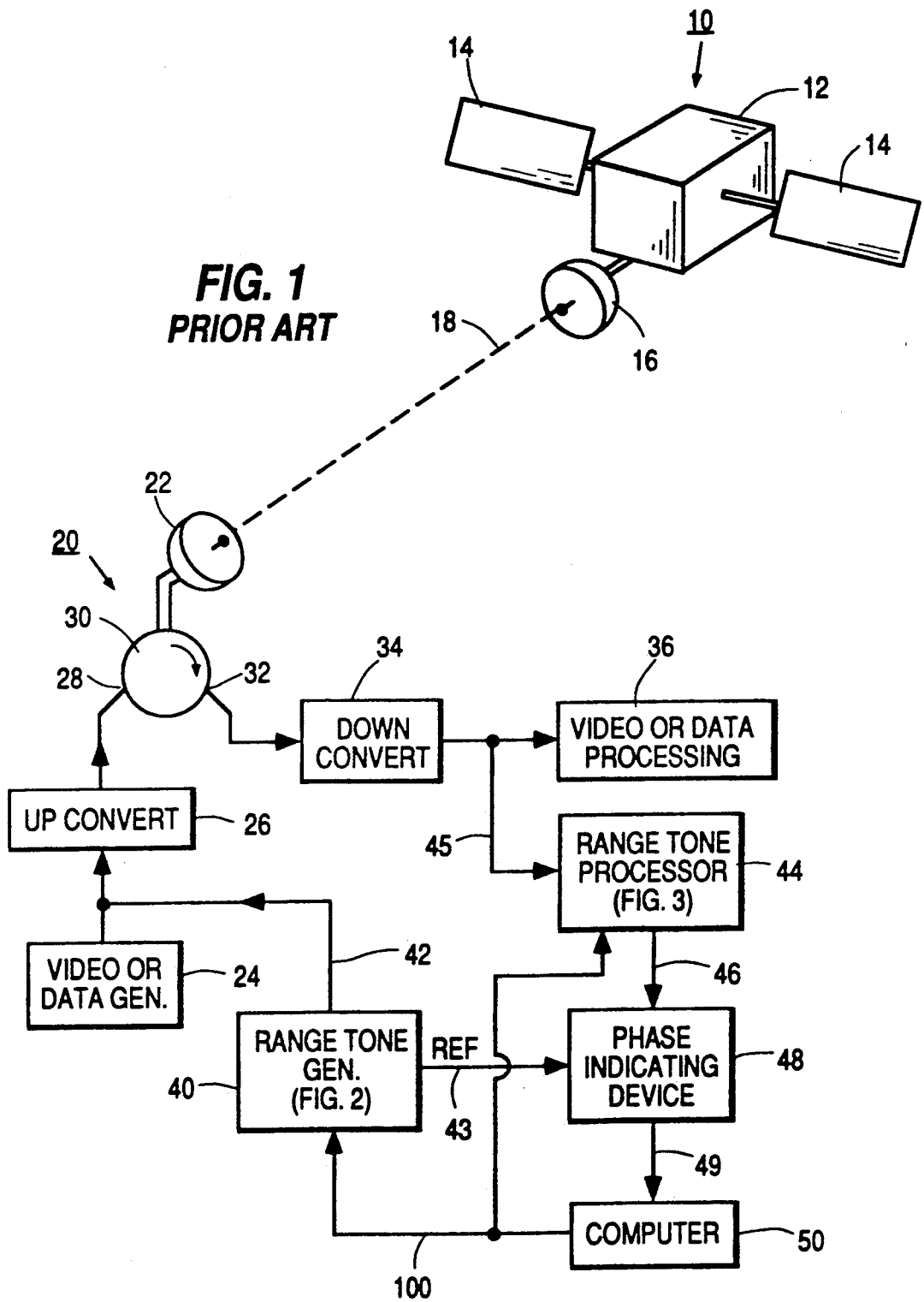
FIG. 1 illustrates a range tone system including a ground station and a spacecraft.
Figure 2:
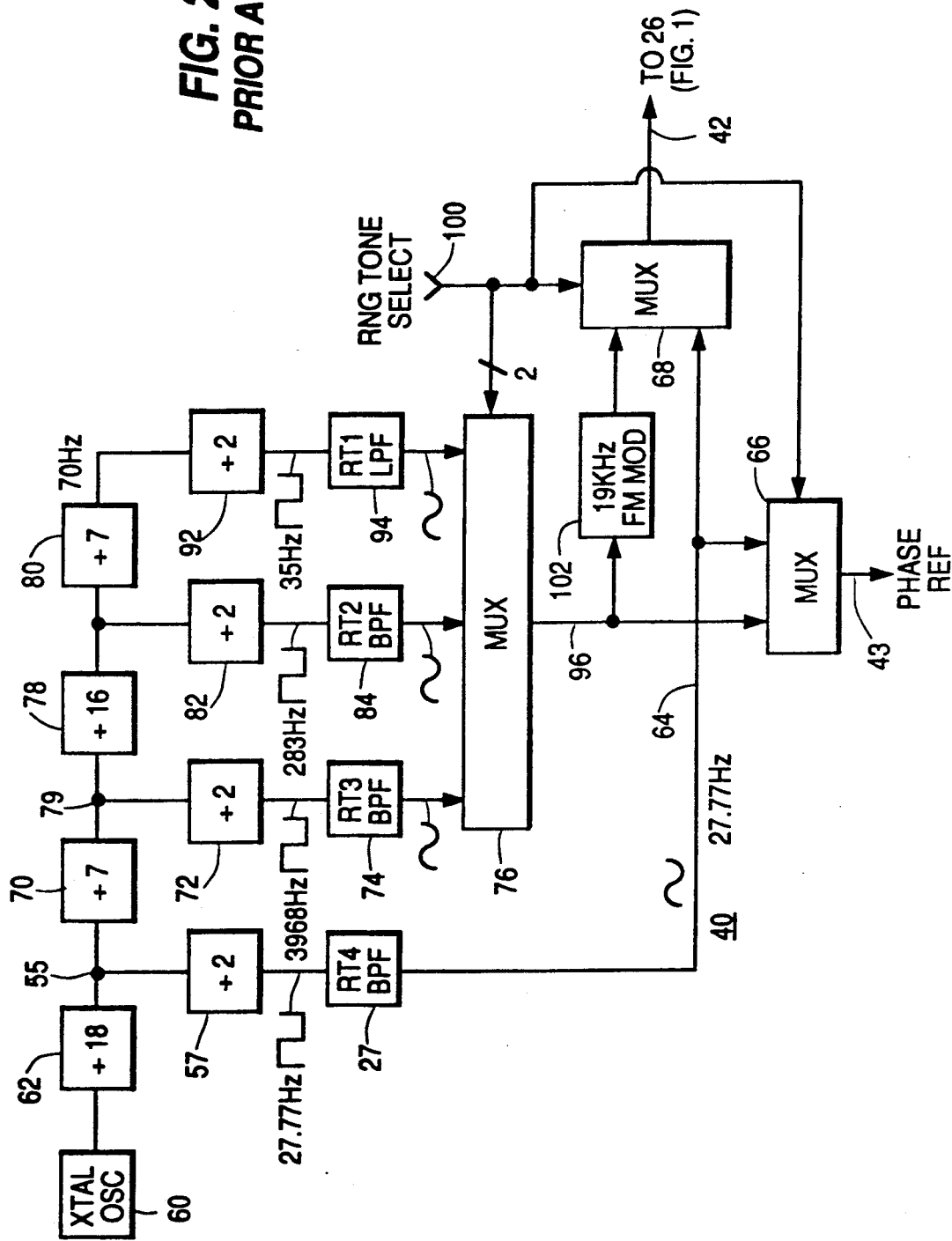
FIG. 2 illustrates a prior art range tone generator which may be used in the system of FIG. 1.
Figure 4:
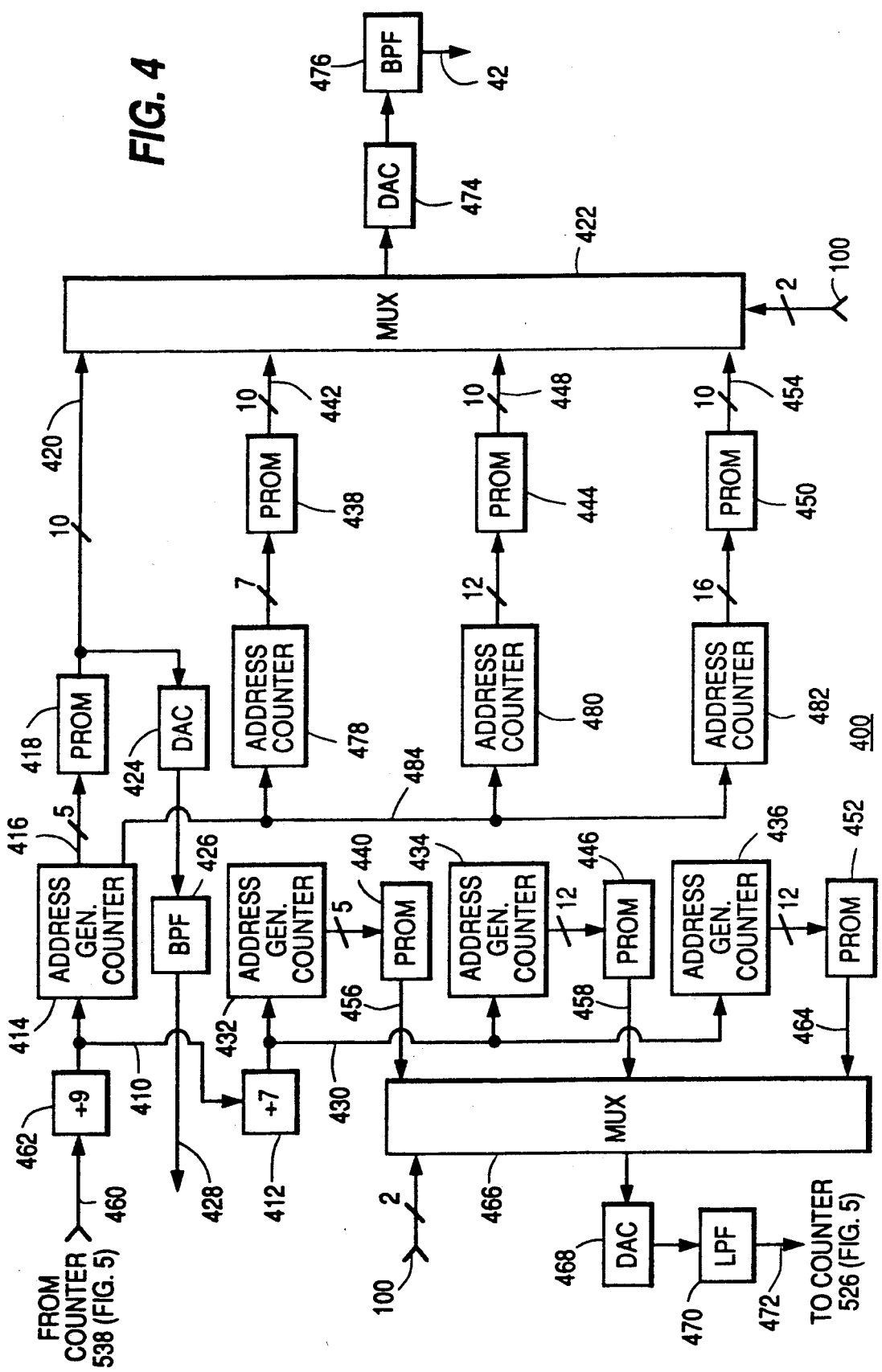
FIG. 4 illustrates a range tone generator in accordance with the invention which may be used in the arrangement of FIG. 1.

FIG. 4 is a simplified block diagram of a range tone generator in accordance with an aspect of the invention, which may be used in place of range tone generator 40 of FIG. 1. In FIG. 4, an 8 MHz clock signal is applied over a conductor 400 to a divide-by-nine counter 462. Counter 462 produces an 888.888 KHz signal on a conductor 410 for application to an address generating counter 414 and a further divide-by-seven counter 412. Address generating counter 414 recurrently counts and produces a recurrent stream of sequential five-bit addresses which are applied over a data path 416 to a programmable ROM (PROM) 418. Counter 414 also produces a 444.44 ... KHz output which is coupled to a conductor 484 for use as a clock signal as described below. PROM 418 is preprogrammed at each addressable memory location with data representing the instantaneous amplitude of a 27.77 KHz (hereinafter "27 KHz") range tone. Samples are produced about 32 times per nominal cycle of the 27 KHz range tone. The amplitude-representative samples produced by PROM 418 in response to the 5-bit addresses are applied over a 10-bit data path 420 to an input of a multiplexer 422, and are also applied to a digital-to-analog converter (DAC) 424. DAC 424 converts the ten-bit amplitude-representative data generated by PROM 418 into a quantized analog signal. The quantized analog signal produced by DAC 424 is filtered by a 27 KHz bandpass filter 426 and is applied by way of a conductor 428 to start a counter associated with the range tone processor 500 of FIG. 5 for purposes described below.

The 888.888 ... KHz signal produced by divider 462 of FIG. 4 is divided by seven in divider 412 to produce a 126.98 KHz clock signal on a conductor 430 for application to address generators 432, 434 and 436. The 444.444 ... Khz clock signal on conductor 484 is applied to address generators 478, 480 and 482. Address generator 478 produces 7-bit addresses which are applied to the address inputs of a PROM 438. PROM 438 is preprogrammed at each addressable memory location with data representing the instantaneous amplitude of a 27 KHz range tone, frequency-modulated by a 3968 Hz range tone. In a particular embodiment of the invention, the deviation is ±1 KHz. FIG. 7a illustrates an amplitude versus time plot of a 3968 Hz sinusoid, and FIG. 7b illustrates a corresponding plot of a 27 KHz sinusoid FM-modulated by the 3968 Hz. An amplitude-representative sample is generated by PROM 418 about 32 times per nominal cycle of the 27 KHz range tone. The 10-bit data produced by PROM 438 is applied over a data path 440 to an input of multiplexer 422. PROM 440 receives addresses from address generator 432, and is preprogrammed with data representing the baseband 3968 Hz range tone (FIG. 7a). Ideally the 3968 Hz range tone represented by the data in PROM 440 is the same phase as the phase of the 3968 Hz modulating signal included in the data programmed into PROM 438. Since both PROM 438 and 440 are addressed by the same clock albeit at different frequencies, the 3968 Hz components which each produces will be phase coherent, but not necessarily in the same phase. The 3968 Hz data produced by PROM 440 is applied over a data path 456 to a multiplexer 466.

The 444.444 ... KHz clock signal on conductor 484 is applied to an address generating counter 480 for generating 12-bit sequential addresses which are applied to a PROM 444. PROM 444 is preprogrammed with data representing the amplitude of a 27 KHz tone frequency-modulated with a 283-Hz tone. When addressed, PROM 444 produces 10-bit signals which are applied over a data path 448 to an input of multiplexer 422. The 126.98 KHz clock signal on conductor 430 is applied to an address generating counters 434 for generating 12-bit sequential addresses. The 12-bit address signals produced by address generating counter 434 are applied to PROM 446, which is preprogrammed with data representing the amplitude of the 283 Hz modulating signal. As in the case of PROMS 438 and 440, the 283 Hz components produced by PROMS 444 and 446 are phase coherent. The data produced by PROM 446 is applied over a data path 458 to an input of multiplexer 466. Similarly, the 444.444 ... KHz clock signal produced by address counter 414 is applied over conductor 484 to an address generating counter 482, which produces 16-bit addresses for addressing PROM 450. PROM 450 is preprogrammed with data representing the amplitude of the 27 KHz tone frequency-modulated by the 35 Hz tone, and its data is applied to multiplexer 422 over a data path 454. The 126.98 KHz clock signal on conductor 430 is applied to an address generating counter 436, which generates 12-bit sequential addresses. The addresses from counter 436 are applied to a PROM 452. PROM 452 is preprogrammed with the 35 Hz modulating range tone, and its data is applied over data path 464 to multiplexer 466.

Counter 462 generates the same clock signals for generating all the FM-modulated range tones, so they all remain phase coherent. This allows the operation to be switched among the three FM-modulated carriers at will, without occasioning a phase jump or error at the time of the switch. This allows continuous 27 KHz range tone to be generated for high resolution range measurement, while at the same time switching among the 3968 Hz, 283 Hz, and 35 Hz ambiguity resolution range tones.

Multiplexers 422 and 466 of FIG. 4 are responsive to the range tone selection signals applied over data path 100 from a front panel or from the computer (FIG. 1), to couple to their outputs one of the signals applied to their inputs. Thus, multiplexer 422 may select one of four signals, namely the 27 KHz unmodulated pilot tone from PROM 418, the 27 KHz pilot tone modulated by 3968 Hz pilot tone produced by PROM 438, the 27 KHz pilot tone frequency modulated by the 283 Hz pilot tone produced by PROM 444, or the 27 KHz tone frequency modulated by the 35 Hz range tone produced by PROM 450. The tone selected by multiplexer 422 is applied to a DAC 474 for conversion into an analog signal. The resulting analog signal is filtered in a bandpass filter 476 having a bandwidth of about 8 KHz, centered on 27 KHz. The filtered signal is applied to conductor 42 for application to upconverter 26 of FIG. 1.

The 27 KHz reference signal is generated continuously by DAC 424 of FIG. 4 in conjunction with bandpass filter 426. The filtered 27 KHz reference tone is made available on conductor 428 for application to the range tone processor in accordance with the invention, which is illustrated as 500 in FIG. 5. In addition to the 27 KHz range tone reference signal applied over conductor 428, one of the 3968 Hz, 283 Hz or 35 Hz reference tones produced by PROMS 440, 446 or 452, respectively, is selected by multiplexer 466 in response to range tone selection signals applied over data path 100. The selected reference range tone is applied to a DAC 468 for conversion into quantized analog form, and is filtered by a low pass filter 470 having a cutoff frequency near 6 KHz. The resulting filtered reference range tone is applied over a conductor 472 to the range tone processor 500 of FIG. 5.

Figure 3:
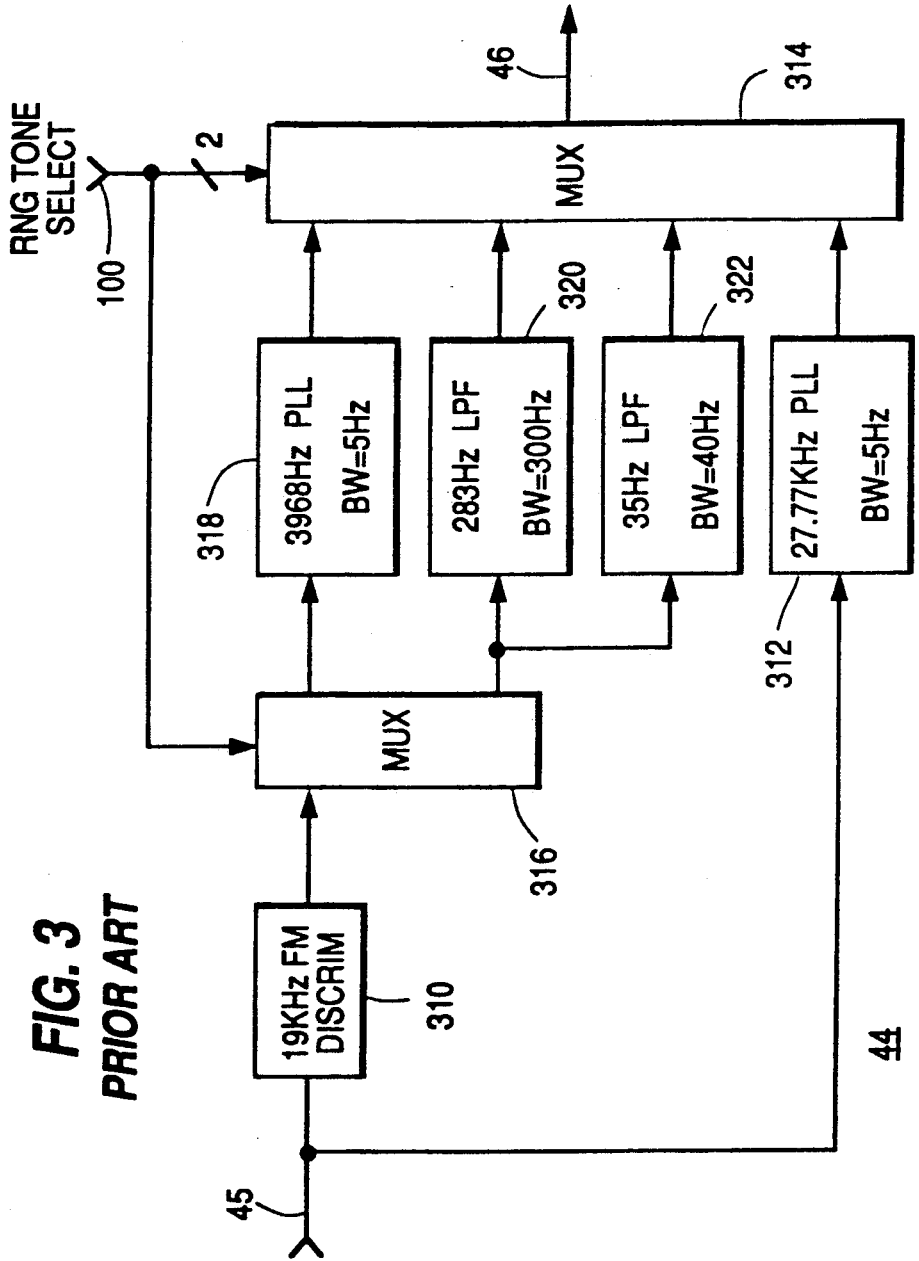
FIG. 3 illustrates a prior art range tone signal processor for processing return signals in the arrangement of FIG. 1.
Figure 5:
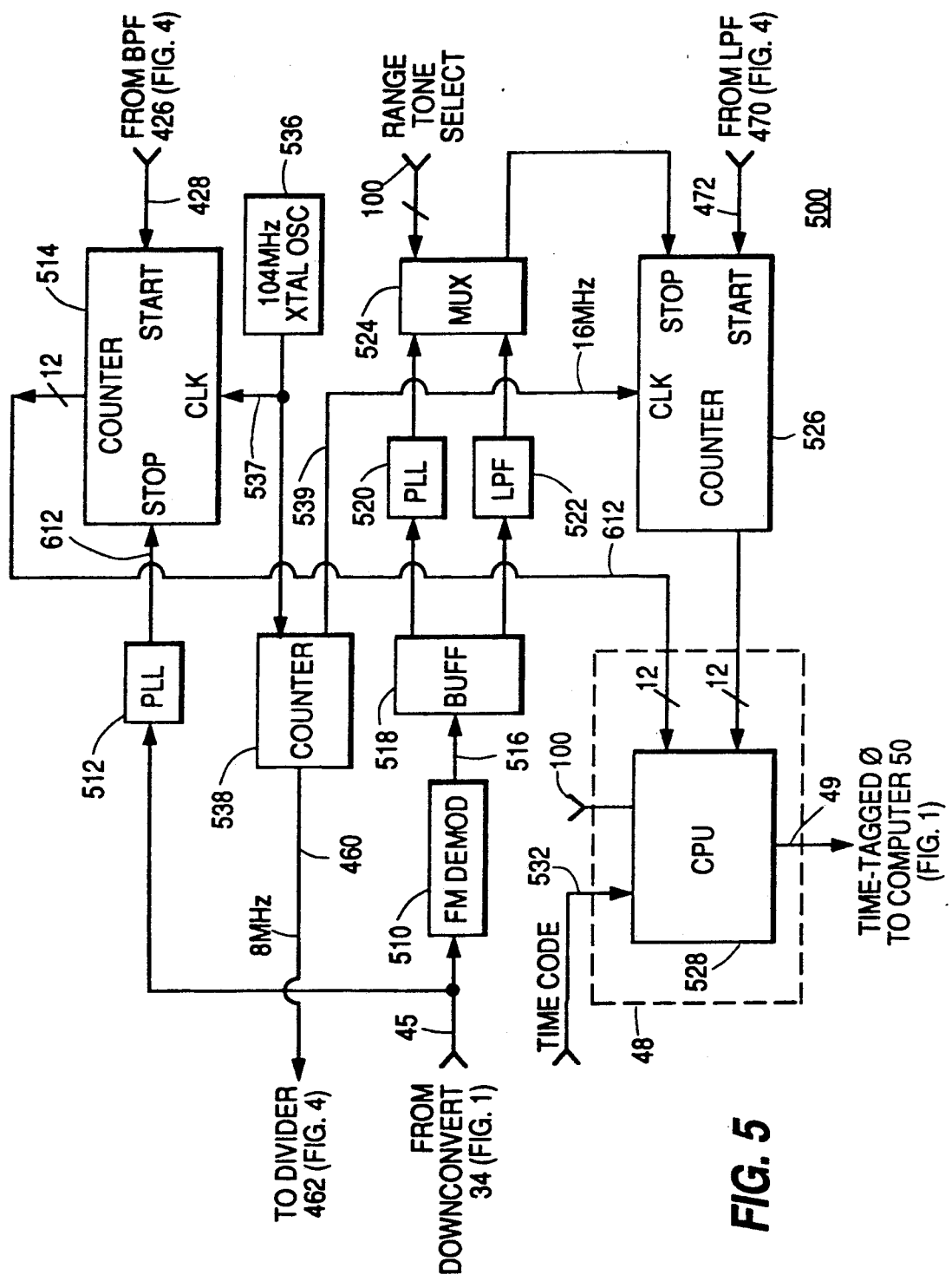
FIG. 5 illustrates a range tone processor in accordance with the invention which may be used in the arrangement of FIG. 1.

FIG. 5 is a simplified block diagram of a range tone processor in accordance with the invention. In FIG. 5, a 104 MHz crystal (XTAL) oscillator 536 produces master clock signals for application to a fine range or time counter 514 and to a further counter 538. Counter 538 divides by thirteen to produce the 8 MHz clock on conductor 460 for application to 462 of FIG. 4, and also divides by 6.5 to produce a 16 MHz clock signal on a conductor 539 for application to a counter 526. Also in FIG. 5, baseband range tones are received over conductor 45 from downconverter 34 of FIG. 1, and are applied in common to an FM demodulator 510 and to a PLL 512 PLL 512 is a narrowband PLL corresponding to PLL 312 of FIG. 3. PLL 512 responds to the unmodulated 27 KHz range tone and also responds to the 27 KHz component of the frequency-modulated 27 KHz range tone. Thus, PLL 512 always receives a 27 KHz range tone component as an input at any time at which range tones are received. PLL 512 produces a filtered 27 KHz tone, which is applied to the STOP input terminal of a counter 514. Counter 514 also receives at its START input terminal the reference 27 KHz range tone from range tone generator 400 of FIG. 4. Counter 514 counts high frequency clock pulses from oscillator 536 beginning at the time of each positive-going zero crossover or crossing of the reference tone until it stops counting upon the occurrence of the next following positive-going zero crossing of the delayed 27 Khz range tone received from PLL 512. The number of clock pulses counted represents the time interval corresponding to the delay of the range tone in the generating and transmitting apparatus, in the receiving apparatus, and in propagation between the spacecraft and the ground station. As described below, time attributable to equipment delays may be calibrated out. The 12-bit high-resolution time or range signal produced by counter 514 is applied to an input of a supplemental processing unit (CPU) 528, which is a part of phase indicating device 48.

When the received range tones includes a frequency-modulated 27 KHz range tone, FM demodulator 510 of FIG. 5 responds by producing one of the 3968 Hz, 283 Hz or 35 Hz range tones. The demodulated range tone is applied by way of a conductor 516 and a buffer 518 to inputs of a PLL 520 and of a low pass filter (LPF) 522. Phase lock loop 520 operates at 3968 Hz with a 5 Hz bandwidth to filter a 3968 Hz tone when it is present, and applies the filtered tone to an input of a multiplexer 524. Low pass filter 522 has a cutoff frequency near 300 Hz, so it can pass both the 283 Hz and the 35 Hz tones to another input of multiplexer 524. Multiplexer 524 selects either the 3968 Hz range tone, or that one of the 283 Hz or 35 Hz range tones which is present, under the control of selection signals applied over data path 100, and applies the selected one of the 3968 Hz, 283 Hz and 35 Hz tones to the STOP input of counter 526. A selected reference range tone is applied to the START input of counter 526 over conductor 472 from range tone generator 400 of FIG. 4. Counter 526 counts 16 MHz clock pulses received over conductor 539, from beginning at the first-positive going zero crossing of the reference range tone applied to the START input and ending at the first positive going zero crossing of the delayed range tone applied to the STOP input. The resulting 12-bit signal provides an indication of the time required for transit of the selected range tone through the range tone generator, receiver, and the space between the spacecraft and the ground station. The 12-bit time or range-representative signal produced by counter 526 is applied to a second input of CPU 528. CPU 528 converts the time-representative signals from counters 514 and 526 into phase signals which can be used by host computer 50 (FIG. 1) in the same manner in the prior art.

CPU 528 receives the 12-bit time-representative signals from counters 514 and 526, and also receives time code signals over a conductor 532 from a source (not illustrated). Simple algorithms relate measured time to phase, if the frequency is known. The frequencies are known to CPU 528 by virtue of the range tone selection signal applied over data path 100. CPU 528 converts the two time measurements to phase, and time-tags each phase-representative signal with a Universal Coordinated Time (UTC) code, so that time consumed in later processing does not result in an error in the time to which the calculated range is ascribed.

Figure 6:
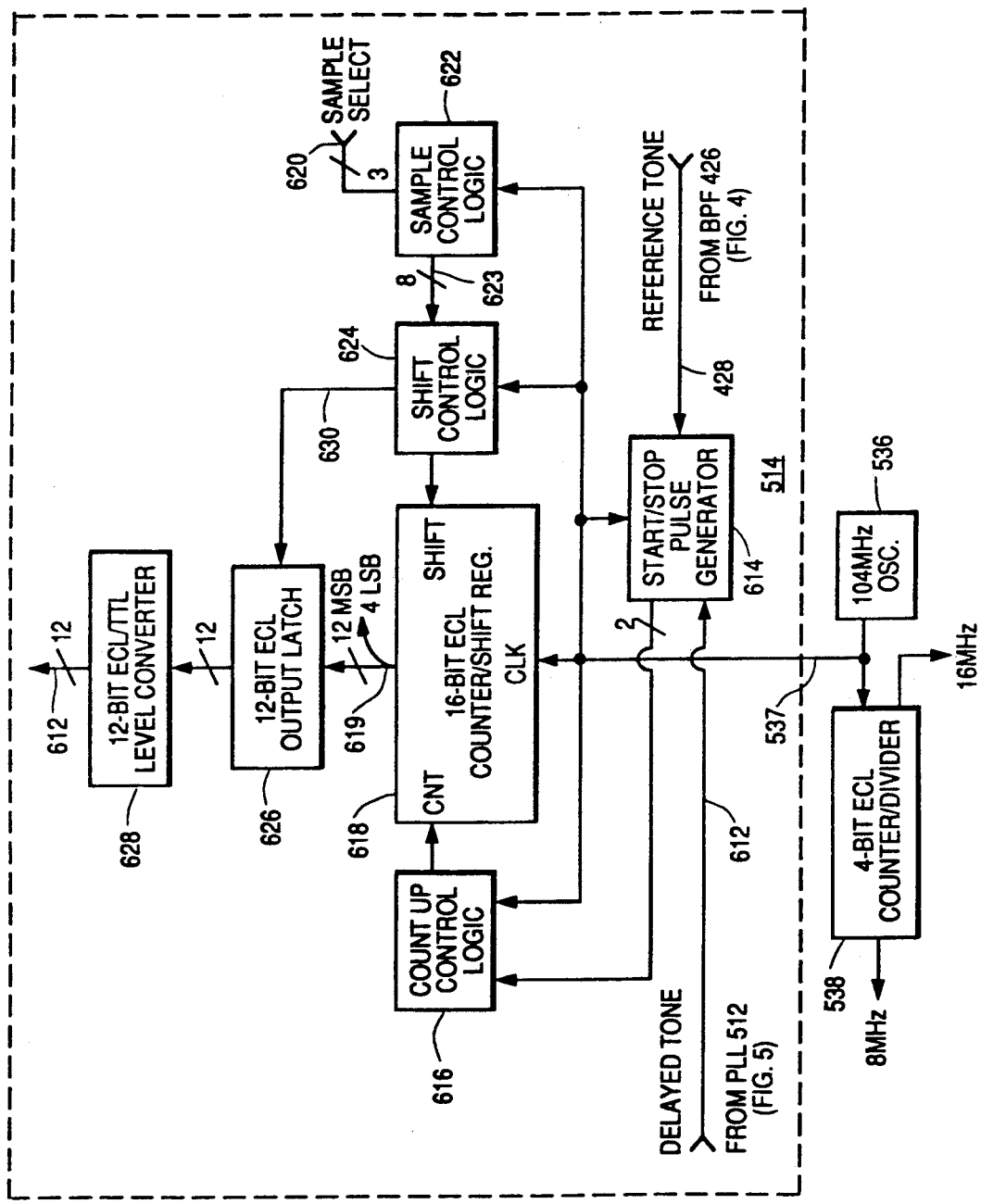
FIG. 6 is a simplified block diagram of a high-resolution ON-OFF counter useful with the arrangement of FIG. 5.

FIG. 6 is a more detailed diagram of counter 14. FIG. 6 is a simplified block diagram illustrating some details of counter 514 of FIG. 5, together with portions of FIG. 5 for reference. Elements of FIG. 6 corresponding to those of FIG. 5 are designated by the same reference numerals. In FIG. 6, 104 MHz oscillator 536, counter/divider 538 and certain other portions are implemented using high-speed technology. At the current state of the art, ECL logic is desired, with transmission-line techniques at appropriate locations, as known in the art.

The 104 MHz clock from oscillator 536 is applied by way of conductor 537 to a start/stop pulse generator 614, a 16-bit ECL counter/shift register 618, count-up control logic 616, shift control logic 624, and sample control logic 622. In general, counter/shift register 618 counts 104 MHz clock pulses when commanded by control logic 616. The count of counter 618 represents a number of 104 MHz clock pulses, thereby indicating range with a resolution near the 9.6 nanosecond period of the 104 MHz clock, corresponding to less than plus or minus 3 meters. Noise and system inaccuracies may exceed this amount. In order to overcome some of these effects, counter/shift register 614 is commanded to count for a selected number of range samples with the 27 KHz range tone, under control of a SAMPLE SELECT input on data path 620, to thereby produce an accumulated count from which an average range can be extracted, averaged over the selected number of samples. The number of samples can be selected to be 1, 2, 4, 8, 16, 32, 64 or 128. When a particular number of samples are taken, as for example 16 samples, the range-representative time count accumulated in counter/shift register 614 is sixteen times greater than it would be if only one range sample were taken. Averaging is accomplished by shifting the count left to accomplish division by $2^N$; for the case of sixteen, $2^N=16$, and $N=4$; as the count is shifted left four times. The sample select signal is applied over data path 620 to sample control logic represented as a block 622, which is essentially a one-of-N converter, which drives one of eight lines of a data path 623. Data path 623 is coupled to shift control logic illustrated as a block 624. Shift control logic 624 responds to the selected conductor of data path 623, and when the accumulated count is completed, causes counter/shift register 618 to shift "left" by the appropriate amount.

The reference 27 KHz tone is presented to start/stop pulse generator 614 of FIG. 6 by way of conductor 428, and the delayed-27 KHz tone is applied over conductor 612. Each of the tones is applied to a high-gain comparator (not illustrated) in generator 614 to produce sharp transitions at the zero crossing, and reference and delayed pulses are produced in response to the positive-going transitions of each tone. The pulses are coupled to count-up control logic 616, which toggles upon the occurrence of each pulse to produce a count-enabling logic level at the count (CNT) input of counter/shift register 618 during the period between the reference and delayed pulses. Thus, during each interval between reference and delayed pulses, counter/shift register 618 counts the 104 MHz clock pulses, to produce an accumulated count on a 16-bit data path 619. The four least significant bits (LSB) of data path 619 are not used, so only the twelve most significant bits (MSB) are coupled to a 12-bit ECL latch 626. Latch 626 responds to the completion of the shift-left command from shift control logic 624, applied over a conductor 630. Once the accumulated count is latched in latch 626, counter/shift register 618 is free to begin another counting and accumulation cycle. The output of latch 626 is converted from ECL to TTL logic levels by ECL/TTL level converter 628, and the count is made available on data path 612 to CPU 528 (FIG. 5). It should be noted that counter/shift register 618 does not necessarily count consecutive 27 KHz pulses when accumulating, but only needs any N samples.

Counter 526 of FIG. 5 operates at a lower clock frequency and need not incorporate ECL logic.

As so far described, the invention simultaneously produces signals representative of the relative phase of two range tones. Consequently, two separate computers such as computer 50 of FIG. 1 can be addressed simultaneously with information allowing continuous high range resolution together with ambiguity resolution. Alternatively, one computer may alternately read the high and low resolution phase information tagged with the time code, and provide unambiguous range.

Other embodiments of the invention will be apparent to those skilled in the art. For example, more or fewer range tones may be used than four, and their frequencies may be selected within the general range from 15 Hz to 50 KHz or more, depending upon the particular satellite or spacecraft. The counters may count at frequencies higher than 104 KHz, as available technology may permit, to thereby provide improved range resolution.

What is claimed is:

1. A spacecraft ranging system, comprising:
   first generating means for generating a first range tone at a first frequency;
   second generating means for generating a second range tone at a relatively lower frequency than said first frequency;
   frequency modulating means coupled to said first and second generating means for frequency modulating said relatively lower frequency second range tone onto said first range tone to produce a modulated tone;
   transmitting means for transmitting said modulated tone between said spacecraft and said ground station;
   retransmitting means located at one of said spacecraft and said ground station for retransmitting said modulated tone back to the other of said spacecraft and ground station to form a retransmitted modulated tone;
   receiving mean for receiving said retransmitted modulated tone, to form a received modulated tone;
   narrowband filter means coupled to said receiving means for filtering said received modulated tone at said first frequency to extract said first range tone and thereby form a filtered first range signal; and
   counting means coupled to said first start signal generating means and to said narrow band filter means for beginning a time count upon the occurrence of a particular portion of at least some cycles of said first range tone and for ending said time count upon the occurrence of a corresponding portion of said filtered first range signal to form a time signal, whereby said time signal is responsive to the range of said spacecraft.

2. A system according to claim 1, further comprising:
   frequency demodulation means coupled to said receiving means for extracting said second range tone from said received modulated tone to produce a demodulated second range tone;
   second filter means coupled to said frequency demodulation means for filtering said demodulated second range tone to form a filtered second range signal; and
   second counting means coupled to said second generating means and to said second filter means for beginning a second time count upon the occurrence of a particular portion of at least some cycles of said second range tone and for ending said time count upon the occurrence of corresponding portions of said filtered second range tone to form a second time signal, whereby said second time signal is responsive to the range of said spacecraft and may be used to resolve range ambiguity in said high resolution range signal.

3. A system according to claim 2, further comprising:
   first angular conversion means coupled to said first-mentioned counting means for converting said first-mentioned time signal into relative phase at said first frequency; and
   second angular conversion means coupled to said second counting means for converting said second time signal time signal into relative phase at said relatively lower frequency.

4. A system according to claim 1 wherein said narrow band filter means comprises a phase-lock loop.

5. A system according to claim 1 wherein said frequency modulating means comprises:
   addressable memory means including plural data locations preprogrammed with data at sequential addresses, which data corresponds, when said data locations are accessed in sequence, to the amplitude of a sinusoid at said first frequency, frequency-modulated by a sinusoid at said relatively lower frequency;
   clock means operating at a frequency higher than said first frequency; and
   address generating means coupled to said clock means and to said memory means for counting clock cycles for generating sequential addresses for said memory means.

6. A method for determining the range between a satellite and a ground station, comprising the steps of:
   generating a modulated range tone representing a first range tone at a first frequency frequency-modulated by a second range tone at a second, lower frequency;
   transmitting said modulated range tone between said ground station and said satellite to form a transmitted range tone signal;
   retransmitting said transmitted range tone signal between said satellite and said ground station to form a retransmitted signal;
   receiving said retransmitted signal to form a received signal;
   narrow band filtering said received signal at said first frequency to recover said first range tone to form a recovered first range tone;
   generating a first clock signal at a frequency above said first frequency;
   beginning counting of said clock signal in response to a portion of said first range tone; and
   ending counting of said clock signal in response to a portion of said recovered first range tone, to thereby generate a range-representative signal.

7. A method according to claim 6 further comprising the steps of:
   frequency-demodulating said received signal to form a recovered second range tone;
   beginning counting of a clock signal in response to a portion of said second range tone; and
   after a period of counting of said clock signal in response to a portion of said second range tone, ceasing said counting in response to a portion of said recovered second range tone, to form a second range-representative signal.

8. A method according to claim 7 further comprising the step of:
   converting each of said first and second range tone times to phase at said first and relatively lower frequencies, respectively, whereby the phase signals may be used to determine range and reduce range ambiguity.

9. A method according to claim 6 wherein said step of generating a modulated range tone comprises the steps of: generating clock pulses at a frequency greater than said first frequency;
   counting clock signals to generate sequential addresses; and
   applying said sequential addresses at said frequency greater than said first frequency to the address input port of a memory preprogrammed at addressable memory locations with information relating to the amplitude of said first range tone frequency-modulated by said second range tone.

* * * * *